March 9, 1965     A. A. KELLEY ETAL     3,172,579
DISPENSING APPARATUS WITH MOVABLE TRAP CHAMBERS
Filed Aug. 22, 1962     2 Sheets-Sheet 1
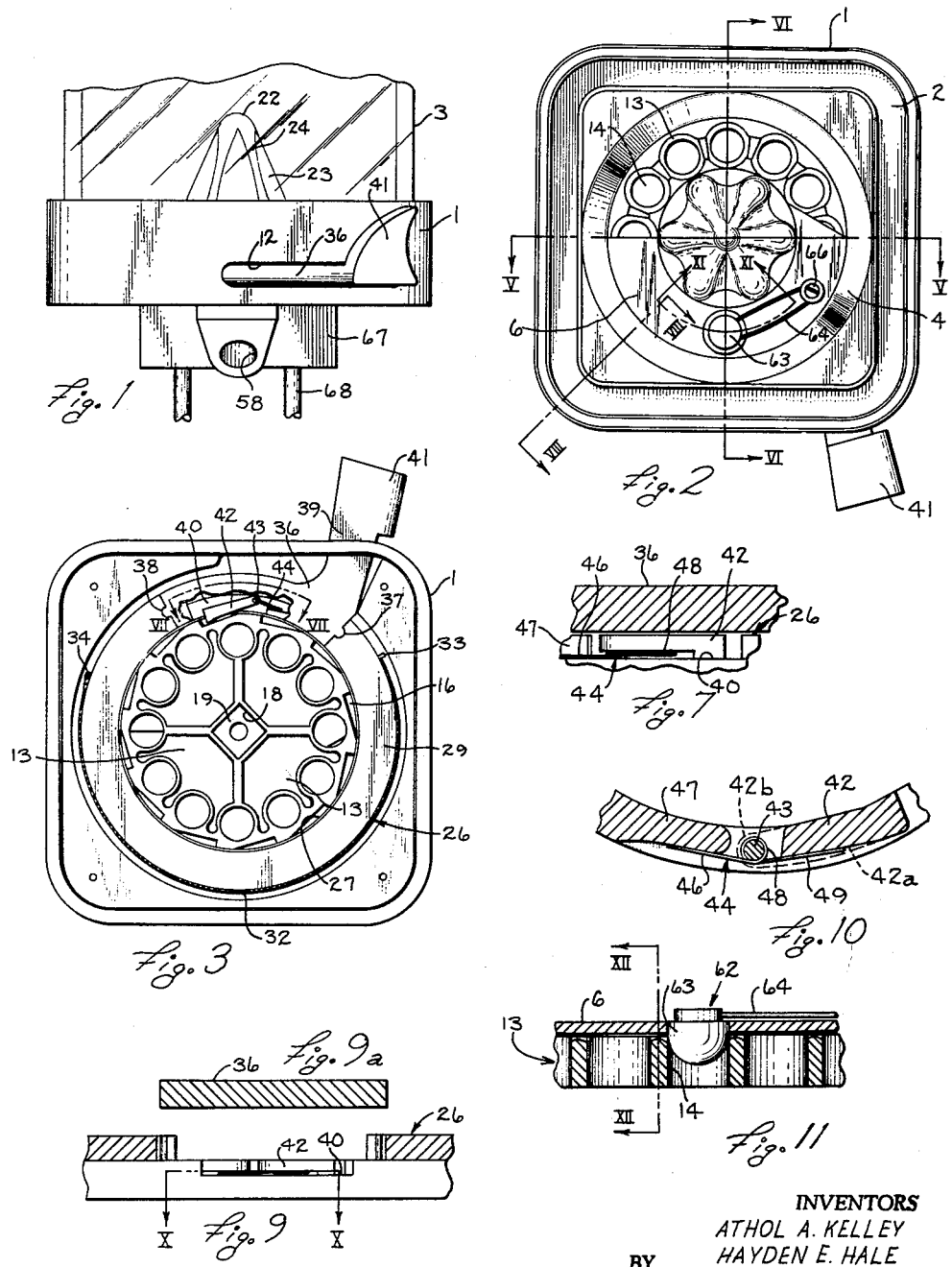
INVENTORS
ATHOL A. KELLEY
HAYDEN E. HALE
BY
ATTORNEYS March 9, 1965   A. A. KELLEY ETAL   3,172,579
DISPENSING APPARATUS WITH MOVABLE TRAP CHAMBERS
Filed Aug. 22, 1962   2 Sheets-Sheet 2
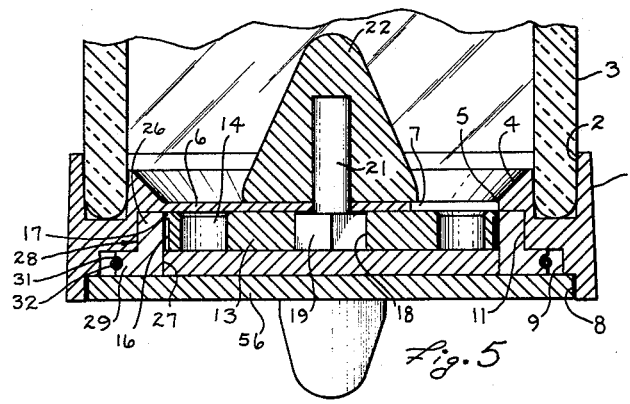
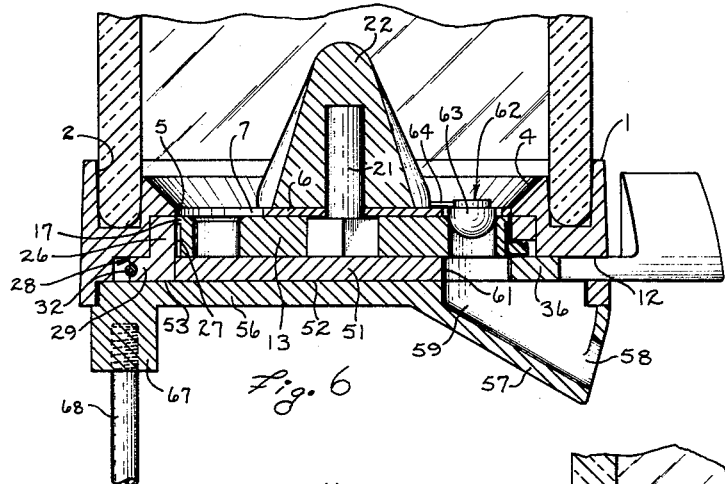
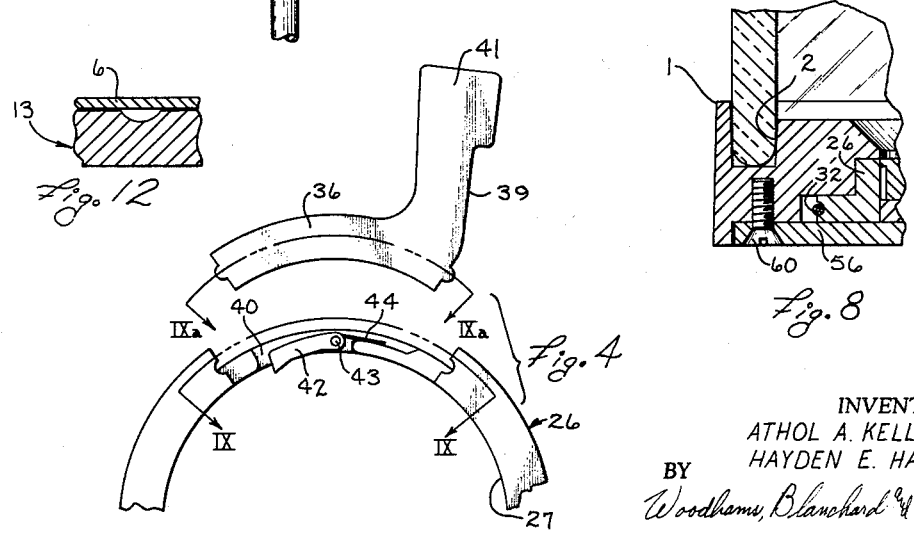
INVENTORS
ATHOL A. KELLEY
HAYDEN E. HALE
BY Woodhams, Blanchard & Flynn
ATTORNEYS

United States Patent Office 3,172,579
Patented Mar. 9, 1965

3,172,579
DISPENSING APPARATUS WITH MOVABLE
TRAP CHAMBERS
Athol A. Kelley, Portage, and Hayden E. Hale, Kalamazoo, Mich., assignors to The Upjohn Company, Kalamazoo, Mich., a corporation of Delaware
Filed Aug. 22, 1962, Ser. No. 218,646
6 Claims. (Cl. 222—225)

This invention relates to a dispensing device and particularly to a type thereof which is adapted for dispensing either measured quantities of bulk material or for dispensing larger individual articles in predetermined numbers, including singly.

While the dispensing device of the invention is of general applicability, it was devised primarily for use in the pharmaceutical trade and intended for dispensing such articles as vitamin capsules on a one-at-a-time basis for such use as in a cafeteria line. Accordingly, for purposes of illustration, reference will hereinafter further be made to such intended use but it will be clearly understood that such specific reference is for illustrative purposes only and is in no sense to be taken as limiting.

Although the applicability of the invention to a variety of other uses will become apparent as the description proceeds, the use of dispensing devices both for bulk material and for individual articles has long been common practice. Examples may be found in the dispensing of such material as sugar or in the dispensing of such articles as vitamin capsules in food-selling establishments, such as cafeterias. For such usage it is well recognized that the apparatus must meet the usual conditions of ease in filling, protection of articles from contamination, accuracy of dispensing but without doing physical harm to the article, sufficient agitation of the articles to prevent bridging of same within the dispenser, and ease of operation along with such design features as will promote low initial cost and low maintenance cost. In addition, and particularly for such use as in a cafeteria line, it is further desirable that the dispenser be capable of operation by one hand and that the dispenser be capable of delivering the material or article accurately to a desired point, including in some cases into the same hand of the user as that which is used to actuate the dispensing mechanism. While this objective has by itself possibly been accomplished in previous machines, it has not, insofar as we are aware, been accomplished in a machine of the simplicity and positive, yet gentle, action on the articles as is accomplished by the machine of the present invention.

Accordingly, the objects of the invention include:

(1) To provide a manually operable device for dispensing a measured quantity of solid material, both bulk material and individual articles of larger size.

(2) To provide a dispensing device, as aforesaid, which will operate with only minor modifications with either bulk material or individual articles.

(3) To provide a manually operable device for dispensing a predetermined number of small articles, such as articles of the size of vitamin capsules.

(4) To provide a dispensing device, as aforesaid, which will operate sufficiently positively upon such articles as to insure accurate dispensing with each actuation of the machine but will still act with sufficient gentleness toward such articles as to prevent damage thereto, whereby the machine is capable of acting on relatively expensive but soft articles such as vitamin capsules.

(5) To provide a device, as aforesaid, in which the dispensing opening is sufficiently close to the operating handle that it can discharge an article into the same hand of the operator as that which is used to actuate the dispensing mechanism.

(6) To provide a dispensing device, as aforesaid, which, while specifically designed for handling vitamin capsules, will be capable of wide applicability to a variety of different sizes, shapes and characteristics.

(7) To provide a dispensing device, as aforesaid, which will comprise only a relatively few parts whereby same may be relatively inexpensive both to manufacture and to maintain in good operating condition.

(8) To provide a dispensing device, as aforesaid, having only a few relatively simple parts, and which parts may be easily assembled and disassembled, whereby same may be readily cleaned as often as necessary to keep same in sanitary condition.

(9) To provide a dispensing device, as aforesaid, which will normally be tightly closed and adequately sealed against entry of dust, dirt or other contaminating material.

Other objects and purposes of the invention will be apparent to persons acquainted with apparatus of this general type upon reading the following disclosure and inspection of the accompanying drawings.

In the drawings:

FIGURE 1 represents a front view of the dispensing portion of the apparatus and showing a fragment of the supply hopper or container used therewith and a portion of the supporting base.

FIGURE 2 shows a top view of the dispenser with the supply hopper removed.

FIGURE 3 shows a bottom view of the dispenser with the bottom covering plate removed.

FIGURE 4 is a view of a portion of the actuating ring removed from the apparatus and showing also the actuating handle separated from the actuating ring.

FIGURE 5 is a section taken on the line V—V of FIGURE 2.

FIGURE 6 is a section taken on the line VI—VI of FIGURE 2.

FIGURE 7 is a section taken on the line VII—VII of FIGURE 3, showing the parts in an enlarged scale.

FIGURE 8 is a section taken on the line VIII—VIII of FIGURE 2.

FIGURE 9 is a section taken on the line IX—IX of FIGURE 4.

FIGURE 9a is a section taken on the line IXa—IXa of FIGURE 4 and positioned in exploded relationship with respect to FIGURE 9.

FIGURE 10 is a section taken on the line X—X of FIGURE 9.

FIGURE 11 is a section taken on the line XI—XI of FIGURE 2.

FIGURE 12 is a section taken on the line XII—XII of FIGURE 11.

GENERAL DESCRIPTION

In general, the invention comprises a self-contained dispensing unit adapted for fastening on the lower end of a suitable hopper or container, such as an inverted glass jar. A dial having a plurality of circumferentially arranged openings therein is provided for receiving a predetermined amount of the material to be dispensed and conveying same to a suitable discharge passageway. A detent device controls the rotation of said dial and also may advantageously act as a positive knockout device for expelling material from said openings into the discharge passageway. A ratchet means is arranged around the periphery of said dial for effecting stepwise advancement thereof. By arranging said ratchet means around the periphery of said dial the stepwise advancing function is obtained without adding to the depth of the apparatus. This permits the discharge conduit to be located immediately below said dial and this in turn permits the apparatus to dispense an article into the same hand of the operator as that which is being used to actuate the mechanism.

DETAILED DESCRIPTION

In the following description certain terminology will be used for convenience in reference which terminology will be recognized as only descriptive and not limiting. For example, the terms "upward" and "downward" will be used to refer to apparatus, or direction with respect to the apparatus, taken with the apparatus in its normal position of use. The terms "rightward" and "leftward" will refer to directions as appearing in the drawings. The terms "inward" and "outward" will refer to directions toward and away from the geometric center of the apparatus. The term "measured amount" will refer both to bulk materials, such as powdered or granular materials, and to somewhat larger articles, such as pharmaceutical capsules, where the "measured amount" will be only a few or even a single one thereof. Said terms will also include derivatives thereof and words of similar import.

Referring now to the drawings, there is shown a body member 1 which in this embodiment is of generally rectangular shape and with rounded corners. Said body member has a recess 2 extending around its upper side for the reception thereinto of a suitable hopper 3. Said hopper may be any of many forms but in this instance is to be an inverted glass jar having a substantially square mouth. Inwardly from said channel 2 is an annular, conical, guide surface 4 connected at its lower and inner edge 5 to a transverse web 6, which web extends across the greater part of the area defined by the lower edge 5 of the guide surface 4 but which is pierced by a feeding opening 7 extending through a portion thereof. Said feeding opening 7 extends as shown in FIGURE 2 around approximately ½ the circumference of the inner and lower edge of the guide surface 4 for reasons hereinafter appearing but the circumferential extent of this opening may be varied quite widely as desired and as hereinafter further discussed to meet particular conditions or requirements of use.

The lower side of the body member 1 is provided with a plurality of concentric recesses 8, 9 and 11 (FIGURE 5) of progressively smaller diameter, said recess 11 communicating with the opening 7. At one side of the apparatus generally opposite to the side at which is located the opening 7, the recess 9 is extended through the side of the body part 1 to provide a slot 12 (FIGURE 6), for purposes appearing hereinafter.

The counting dial 13 is of circumference substantially, but not necessarily exactly, equal to the inner and lower edge 5 of the guide surface 4 and is of thickness substantially equal in this embodiment to the depth of the recess 11. It is provided with a plurality of measuring openings 14, sometimes hereinafter called traps, arranged circumferentially around same and is further provided peripherally with a plurality of ratchet notches 16. Said ratchet notches, however, do not extend the full axial distance of said dial but instead said dial includes a flange 17 in order firmly to guide same within the hereinafter-described surrounding and guiding member.

Centrally of said dial 13 there is preferably a non-circular opening 18 for the reception of a correspondingly shaped head 19 integrally connected to a pin 21. Said pin is fixed, as by cementing, to an agitator 22 which is of any convenient shape but in this embodiment is generally cone-shaped and provided with flutes of which two are shown at 23 and 24, whereby rotation of said agitator will gently but sufficiently agitate the articles within the container as to prevent bridging thereof.

In this embodiment as best shown in FIGURE 2, said flutes are preferably aligned with selected ones of the traps 14, such as every other one thereof.

Surrounding the dial 13 is the actuator ring 26, the same having a smooth and circular inner surface 27 and a stepped outer surface 28 to enable same to fit snugly but rotatably into the recesses 9 and 11. The flange portion 29 of said actuating ring 26 is preferably provided with a peripheral groove 31 for the reception of a spring 32. Said spring is anchored at one end to said flange 29 in any suitable manner, such as by a pin 33 (FIGURE 3), and is anchored to the base member 1 at its other end by any other suitable means, such as a further pin 34.

A segment 36 of said flange portion 29 is removable from the rest of the said actuator ring, the same being held thereto by any convenient readily disconnectible means, such as the tongue and groove arrangements indicated at 37 and 38. Said removable portion 36 includes the handle structure 39 to which is affixed a handle 41 shaped for convenient manipulation by the thumb of the operator. The handle structure 39 extends through the above-mentioned slot 12 and the separability of the segment 36 permits passage thereof through said slot 12 when the parts are being assembled and disassembled.

With the portion 36 removed from the actuator ring 26, and as viewed from the bottom of said apparatus, there is then exposed a recess 40 containing a pawl 42 which has a groove 42a (FIGURE 10) in the radially outer side thereof, the broken line 42b in FIGURE 10 indicating the full size of the pawl as shown in FIGURE 4. Said pawl is pivoted to a pin 43 at the bottom of said recess 40 and is axially aligned with the notches 16 in the periphery of the dial 13. A spring 44 is provided for urging said pawl constantly inwardly against the dial 13, in this instance said spring 44 comprises an arm 46 bearing against an adjacent portion 47 of the actuator ring 26, a loop 48 encircling the pin 43 and a further arm 49 bearing inwardly within the groove 42a against the outside of said pawl 42.

A spacer plate 51 is provided in this embodiment below the dial 13 having its bottom surface 52 flush with the bottom surface 53 of the actuator ring 26. The use of such spacer plate 51, however, depends upon the thickness of the dial 13 which in turn depends upon the size of the articles being dispensed. Thus, if the articles being dispensed are of such dimension that a single such article will extend from the upper end of one of the openings 14 to a point substantially flush with the bottom surface 53 of the actuator ring 26, then the dial 13 will be made of thickness equal to that of the actuator ring 26 and the spacer plate 51 will be omitted.

A bottom closure plate 56 is received snugly into the recess 8, is held therein by any convenient means such as screws of which one appears at 60 (FIGURE 8) and holds the dial 13, actuator ring 26 and spaced plate 51, as well as the other parts associated therewith, properly in operating position. Said closure plate 56 has a downwardly extending boss 57 thereon through which is provided a dispensing opening 58, said opening 58 being connected by suitable channel 59 which latter is in registry with an opening 61 in the spacer plate 51, where such spacer plate is used, and said openings 59 and 61 being also in registry with a preselected discharge position of one of the openings in the dial 13.

A combined detent and ejection device 62 comprises in this embodiment a somewhat hemispherical head member 63 which is fastened by a spring element 64 through a screw 66 to the transverse web 6. Said head 63 extends partially into the several openings 14 one at a time and as the dial 13 is caused to rotate said head will act as a detent tending to hold said dial in a given position with one of said openings 14 in alignment with the openings 61 and 59. Further, however, due to the placement and size of the head 63, it will also tend to act as a knockout device for dislodging an article within a given one of the openings 14 and driving it downwardly into the dispensing channel 59. While it will be evident that the device 62 can also be arranged to function as an anti-reverse mechanism by causing it to engage any of the traps 14 other than the one positioned at any given time in registry with the dispensing opening 61, it will be prefearble to have the device 62, even for solely detent purposes, act with the trap positioned in registry with the discharge opening 61 for the reason that it will insure that the opening from which discharge is to take place will be aligned with the dispensing opening 61. By so doing, accurate discharge is insured even though the several traps 14 are not equally spaced around the dial 13.

A further extension 67 is preferably provided in the lower side of the closure plate 56 to provide an anchor for base means 68, which may be of any convenient type and screwed into the part 67 if desired.

OPERATION

The apparatus is shown in its "at rest" position wherein the spring 32 acting on the actuating ring 26 rotates it into its extreme clockwise position, as viewed in FIGURE 3, by which the handle 41 is at the exereme rightward end of the slot 12. At the same time the detent device 62 is holding the dial 13 aligned so that one of the openings 14 is in exact alignment with the openings 61 and 59. This creates a relationship between the dial 13 and the actuator ring 26 such that one of the notches 16 is aligned with the pawl 42 whereby the pawl enters into said notch as shown in FIGURE 3 as held therein by the spring 44. Articles to be dispensed occupy the interior of the container 3 and tend to pass through the opening 7 to enter into the several openings 14 in the dial 13. Where such articles do not enter into said openings immediately, a few actuations of the apparatus as hereinafter further described will cause sufficient agitation of said articles to effect the entry of same properly into said openings 14.

To effect a dispensing operation, and noting that the device herein illustrated and described has been built for a normally right-handed person, the right hand of the operator is placed immediately below the dispensing opening 58 and his thumb may then conveniently be placed against the handle 41. Movement of said handle 41 against the force of the spring 32 (leftwardly in FIGURE 1 or counterclockwise in FIGURE 3) effects a counterclockwise (FIGURE 3) rotation of the actuator ring 26 which causes the pawl 42 to engage the adjacent one of ratchet notches 16 for causing corresponding motion of the dial 13. As said dial 13 moves, it pushes the head 63 upwardly against the force of the spring 64 until the next following one of the openings 14 comes substantially below said head. Said head will then come downwardly in response to the force of said spring 64 and drive an article within the opening 14 thereunder into the dispensing channel 59 and out through the dispensing opening 58 into the hand of the operator. In the meantime the spring 32 will effect a return (clockwise as seen in FIGURE 3) rotation of the actuating ring 26 so that the handle 41 returns to the position shown in the drawings and the pawl 42 engages the next following one of the ratchet notches 16. The detent head 63 prevents corresponding reverse rotation of the dial 13. The dispenser is now ready for a repeat operation.

While the opening 7 has herein been indicated as being approximately 180 degrees in extent, it may be of greater or less extent as needed according to the circumstances of use. Where the articles being dispensed are of generally irregular shape and tend to lock somewhat together, then the opening should be as large as possible within the limits of strength considerations to make sure that the required number of such articles enter into each of the openings 14 while said openings are exposed to the articles, that is, before said openings become covered by the web 6.

On the other hand, where the articles are of somewhat more free-flowing nature and such a large area of exposure of the openings 14 to the articles is unnecessary, then the size of the opening 7 may be diminished in order to improve the strength of the apparatus by correspondingly increasing the size of the web 6.

Although a particular preferred embodiment of the invention has been disclosed above for illustrative purposes, it will be understood that variations or modifications thereof which lie within the scope of the appended claims are fully contemplated.

What is claimed is:

1. An apparatus for dispensing tablets or measured quantities of solid material from a container for same, comprising:

a body member having a transverse web with an elongated filling opening therethrough, said opening being spaced from the center of said web, said body member also having an ejection opening through said web at a point spaced circumferentially from said filling opening and located substantially the same distance from said center;

a counting dial disposed adjacent one side of said web and being mounted for rotation with respect to said web about an axis passing through said center of said web, said dial having a series of circumferentially spaced trap openings adapted to register with said filling opening an dsaid ejection opening in said transverse web, said counting dial having a series of ratchet notches in the periphery thereof;

a substantially conical agitator whose base is disposed adjacent the other side of said web and which extends away therefrom, said agitator having a series of circumferentially spaced flutes on the periphery thereof and extending substantially from the apex thereof to the base thereof and means passing through the center of said web and connecting said agitator and said counting dial for conjoint rotation;

closure plate means disposed adjacent to and on the other side of said counting dial from said transverse web, said closure plate means having a passage therethrough adapted to register with said trap openings whereby the contents of said trap openings can be discharged through said passage in said closure plate means;

an actuator ring completely surrounding said counting dial and means supporting said ring for back and forth arcuate movement about said axis;

spring means connected to said actuator ring for normally urging same into a predetermined position with respect to said passage in said closure plate means;

a handle structure connected to said actuator ring for effecting arcuate movement thereof about said axis;

a pawl pivotally mounted on said actuator ring in alignment with said ratchet notches in said counting dial and spring means constantly urging said pawl toward the periphery of said counting dial whereby pivotal movement of said actuator ring away from said predetermined position by said handle structure will effect engagement of said pawl in one of said ratchet notches and thereby will effect stepwise rotational movement of said counting dial and said agitator about said axis, said pawl being out of driving engagement with said ratchet notches when said actuator ring is moved back to said predetermined position;

a detent and ejection device comprising a generally hemispherical head member receivable through said ejection opening in said web and into a trap opening in registry therewith to discharge the contents of said last-named trap opening, said device also including a leaf spring mounted on said other side of said web and extending generally parallel thereto and having said head member mounted thereon adjacent the other end thereof for constantly urging said head member into said ejection opening put permitting said head member to be moved out of the trap opening when said counting dial is being rotated.

2. An apparatus for dispensing tablets or measured quantities of solid material from a container for same, comprising:

a body member having a transverse web with an elongated filling opening therethrough;

a counting dial disposed adjacent one side of said web and being mounted for rotation with respect to said web about an axis passing through said web, said dial having a series of circumferentially spaced trap openings adapted to register with said filling opening in said transverse web, said counting dial having a series of ratchet notches in the periphery thereof;

closure plate means disposed adjacent to and on the other side of said counting dial from said transverse web, said closure plate means having a passage therethrough adapted to register with said trap openings whereby the contents of said trap openings can be discharged through said passage in said closure plate means;

an actuator ring completely surrounding said counting dial and means supporting said ring for back and forth arcuate movement about said axis;

spring means connected to said actuator ring for normally urging same into a predetermined position with respect to said passage in said closure plate means;

a handle structure connected to said actuator ring for effecting arcuate movement thereof about said axis; and a pawl pivotally mounted on said actuator ring in alignment with said ratchet notches in said counting dial and spring means constantly urging said pawl toward the periphery of said counting dial whereby pivotal movement of said actuator ring away from said predetermined position by said handle structure will effect engagement of said pawl in one of said ratchet notches and thereby will effect stepwise rotational movement of said counting dial about said axis, said pawl being out of driving engagement with said ratchet notches when said actuator ring is moved back to said predetermined position.

3. An apparatus according to claim 2, in which said body member has peripheral wall means surrounding said actuator ring, said wall means having an elongated slot therethrough adjacent a portion of the periphery of said actuator ring, said actuator ring including a segment removably attached to the remainder of said actuator ring, said handle member being connected to said segment and extending radially outwardly therefrom through said slot.

4. An apparatus according to claim 2, in which said actuator ring is comprised of a first portion completely encircling said counting dial and a second portion removably connected to said first portion, said handle structure being connected to said second portion, said second portion overlying a part of said first portion, means defining a recess between said first and second portions, said pawl and the spring means for urging same toward said counting dial being mounted in said recess.

5. An apparatus according to claim 4, in which said pawl is mounted on a pin disposed within said recess, the spring means for urging said pawl toward said counting dial comprising a loop portion encircling said pin and a pair of elongated arms extending in opposite directions from said loop portion and substantially circumferentially with respect to said actuator ring, one of said arms bearing against said pawl and the other of said arms bearing against said first portion of said actuator ring.

6. An apparatus according to claim 5, in which said pawl and said first portion of said actuator ring have grooves therein and said arms are received in said grooves.

References Cited by the Examiner

UNITED STATES PATENTS

| 113,550 | 4/71 | Morrison | 222—225 |
|---|---|---|---|
| 510,294 | 12/93 | Richards | 222—225 |
| 1,172,603 | 2/16 | Johnson | 222—225 |
| 1,651,605 | 12/27 | Kuhn et al. | 221—265 X |
| 1,966,326 | 7/34 | Wentorf | 222—360 |
| 1,973,566 | 9/34 | Hanson | 222—360 X |
| 1,981,931 | 11/34 | Vogel et al. | 221—265 X |
| 2,129,185 | 9/38 | Simmons | 221—265 X |
| 2,176,232 | 10/39 | Warren et al. | 222—360 X |
| 2,472,688 | 6/49 | Wydra | 222—248 |
| 3,028,049 | 4/62 | Eppy | 221—265 X |

LOUIS J. DEMBO, *Primary Examiner.*